United States Patent
Yang

(10) Patent No.: US 9,137,268 B2
(45) Date of Patent: Sep. 15, 2015

(54) METHOD, TERMINAL, AND SERVER FOR OBTAINING HEARTBEAT PERIOD

(71) Applicant: Huawei Technologies Co., Ltd., Shenzhen, Guangdong (CN)

(72) Inventor: Shengqiang Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 13/686,086

(22) Filed: Nov. 27, 2012

(65) Prior Publication Data

US 2013/0185421 A1    Jul. 18, 2013

Related U.S. Application Data

(63) Continuation of application No. PCT/CN2012/075787, filed on May 21, 2012.

(30) Foreign Application Priority Data

Jan. 17, 2012 (CN) .......................... 2012 1 0013866

(51) Int. Cl.
*G06F 9/00* (2006.01)
*H04L 29/06* (2006.01)
*H04W 4/00* (2009.01)
*H04W 4/02* (2009.01)
(Continued)

(52) U.S. Cl.
CPC ............. *H04L 65/1066* (2013.01); *H04W 4/00* (2013.01); *H04W 4/02* (2013.01); *Y02B 60/50* (2013.01)

(58) Field of Classification Search
CPC ........... H04L 12/43; H04L 12/26; H04B 7/00
USPC ....................................................... 709/224
See application file for complete search history.

(56) References Cited

U.S. PATENT DOCUMENTS

| 8,001,590 B1 * | 8/2011 | Moeck et al. .................. 726/11 |
| 2006/0084408 A1 | 4/2006 | Wang |
| 2008/0082142 A1 | 4/2008 | Clark et al. |

(Continued)

FOREIGN PATENT DOCUMENTS

| CN | 1756392 A | 4/2006 |
| CN | 101518030 A | 8/2009 |

(Continued)

OTHER PUBLICATIONS

Foreign Communication From a Counterpart Application, European Application No. 12866327.5, Extended European Search Report dated Mar. 5, 2014, 5 pages.

(Continued)

*Primary Examiner* — Emmanuel L Moise
*Assistant Examiner* — Zia Khurshid
(74) *Attorney, Agent, or Firm* — Conley Rose, P.C.; Grant Rodolph; Nicholas K. Beaulieu

(57) ABSTRACT

The present invention provides a method, a terminal, and a server for obtaining a heartbeat period. According to the present invention, the terminal sends a first heartbeat message that includes location information of the terminal to the server and obtains a heartbeat period which corresponds to the foregoing location information directly from the server. This avoids each terminal needing to perform multiple heartbeat message interactions with the server when determining a heartbeat period that best matches a current network, thereby reducing power consumption of the terminal and signaling loads of a device at the network side.

22 Claims, 5 Drawing Sheets

(56) References Cited

U.S. PATENT DOCUMENTS

2008/0165796 A1    7/2008  Martinez et al.
2009/0274058 A1*  11/2009  Seto et al. ............. 370/252
2009/0276491 A1*  11/2009  Lin et al. ................ 709/204

FOREIGN PATENT DOCUMENTS

| CN | 101621750 A | 1/2010 |
| CN | 101754316 A | 6/2010 |
| CN | 101917437 A | 12/2010 |
| CN | 101951348 A | 1/2011 |
| CN | 102217402 A | 10/2011 |
| CN | 102223257 A | 10/2011 |

OTHER PUBLICATIONS

Foreign Communication from a counterpart application, International Search Report and Written Opinion, PCT/CN2012/075787, Nov. 1, 2012, 10 pages.
Foreign Communication From a Counterpart Application, International Application No. PCT/CN2012/075787, International Search Report dated Nov. 1, 2012, 2 pages.
Foreign Communication From a Counterpart Application, English Translation of International Application No. PCT/CN2012/075787, International Search Report dated Nov. 1, 2012, 2 pages.
Foreign Communication From a Counterpart Application, International Application No. PCT/CN2012/075787, Written Opinion dated Nov. 1, 2012, 4 pages.
Foreign Communication From a Counterpart Application, International Application No. PCT/CN2012/075787, English Translation of Written Opinion dated Nov. 1, 2012, 5 pages.
Partial English Translation and Abstract of Chinese Patent Application No. CN101917437A, Part 1, Jul. 13, 2015, 17 pages.
Partial English Translation and Abstract of Chinese Patent Application No. CN101917437A, Part 2, Jul. 13, 2015, 5 pages.
Foreign Communication From A Counterpart Application, Chinese Application No. 201210013866.7, Chinese Search Report dated Jun. 30, 2015, 8 pages.

* cited by examiner

METHOD, TERMINAL, AND SERVER FOR OBTAINING HEARTBEAT PERIOD

CROSS-REFERENCE TO RELATED APPLICATIONS

This application is a continuation of International Application No. PCT/CN2012/075787, filed on May 21, 2012, which claims priority to Chinese Patent Application No. 201210013866.7, filed on Jan. 17, 2012, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to communication technologies, and in particular, to a method, a terminal, and a server for obtaining a heartbeat period.

BACKGROUND

With the development of communication technologies, more and more application programs are integrated on a terminal, for example, MSN, QQ, and other instant messenger (IM) application programs. In a process of running the foregoing IM application programs, when no data is transmitted, a corresponding client sends a heartbeat (HB) message to a server periodically so as to inform, through a device at the network side, the server of its own online state and maintain a session connection.

A heartbeat period depends on configurations of a network traversed by the heartbeat. If the heartbeat period is too short, the power consumption of the terminal is seriously affected, the network traffic is increased, and the performance of each network element in the network and a system is affected. However, if the heartbeat period is too long, it may exceed a timeout interval set by some network elements in the network to detect when no data is transmitted, thereby causing the release of a session connection and a failure to achieve a purpose of connection keep-alive. For example, for a firewall or network address translation (NAT) device deployed in the network, the session-hold time of the firewall is set to be relatively short to ensure the security of an internal network, and the transmission control protocol (TCP) session-hold time is generally 20 to 30 minutes. If no data is transmitted in the session, the session information is forcibly released after the time expires, and in this way, all subsequent messages are discarded. To avoid the occurrence of the foregoing case, in the prior art, the terminal adjusts the heartbeat period gradually to gradually approach an optimal heartbeat period that the network can support so as to adapt to different network configuration situations automatically.

In the prior art, however, the terminal needs to perform multiple heartbeat message interactions with the server to adjust the heartbeat period gradually, which causes power consumption of the terminal and increases signaling loads of the device at the network side at the same time, thereby affecting the system performance.

SUMMARY

The present invention provides a method, a terminal, and a server for obtaining a heartbeat period, which is used to determine a heartbeat period that best matches a current network and reduce power consumption of a terminal and signaling loads of a device at the network side.

In one aspect, a method for obtaining a heartbeat period is provided, where the method includes: sending, by a terminal, a first heartbeat message to a server, where the first heartbeat message includes location information of the terminal; and receiving, by the terminal, a heartbeat period sent by the server and corresponding to the location information, where the heartbeat period is obtained from a pre-established heartbeat period table when the server matches the location information with the heartbeat period table successfully.

In another aspect, a method for obtaining a heartbeat period is provided, where the method includes: receiving, by a server, a first heartbeat message sent by a terminal, where the first heartbeat message includes location information of the terminal; matching, by the server, the location information with a pre-established heartbeat period table; and if the matching succeeds, obtaining, by the server, a heartbeat period which corresponds to the location information and sending the heartbeat period to the terminal.

In another aspect, a terminal is provided that includes: a first sending unit configured to send a first heartbeat message to a server, where the first heartbeat message includes location information of the terminal; and a receiving unit configured to receive a heartbeat period sent by the server and corresponding to the location information, where the heartbeat period is obtained from a pre-established heartbeat period table when the server matches the location information with the heartbeat period table successfully.

In another aspect, a server is provided that includes: a receiving unit configured to receive a first heartbeat message sent by a terminal, where the first heartbeat message includes location information of the terminal; a matching unit configured to match the location information with a pre-established heartbeat period table; and a sending unit configured to, when the matching performed by the matching unit succeeds, obtain a heartbeat period which corresponds to the location information and send the heartbeat period to the terminal.

It can be known from the foregoing technical solutions, in embodiments of the present invention, a terminal sends a first heartbeat message that includes location information of the terminal to a server and obtains a heartbeat period which corresponds to the foregoing location information directly from the server; it is avoided that each terminal needs to perform multiple heartbeat message interactions with the server when determining a heartbeat period that best matches a current network, thereby reducing power consumption of the terminal and signaling loads of a device at the network side.

BRIEF DESCRIPTION OF THE DRAWINGS

To describe the technical solutions in embodiments of the present invention or in the prior art more clearly, the accompanying drawings required for describing the embodiments or the prior art are briefly introduced in the following. Apparently, the accompanying drawings in the following description are only some embodiments of the present invention, and persons of ordinary skill in the art can further derive other drawings according to these accompanying drawings without creative efforts.

DETAILED DESCRIPTION

In order to make the objectives, technical solutions, and advantages of the embodiments of the present invention clearer, the technical solutions in the embodiments of the present invention are described clearly and completely in the following with reference to the accompanying drawings in the embodiments of the present invention. Apparently, the described embodiments are only a part of embodiments of the present invention, rather than all the embodiments. All other embodiments derived by persons of ordinary skill in the art based on the embodiments of the present invention without any creative effort shall fall within the protection scope of the present invention.

Figure 1:
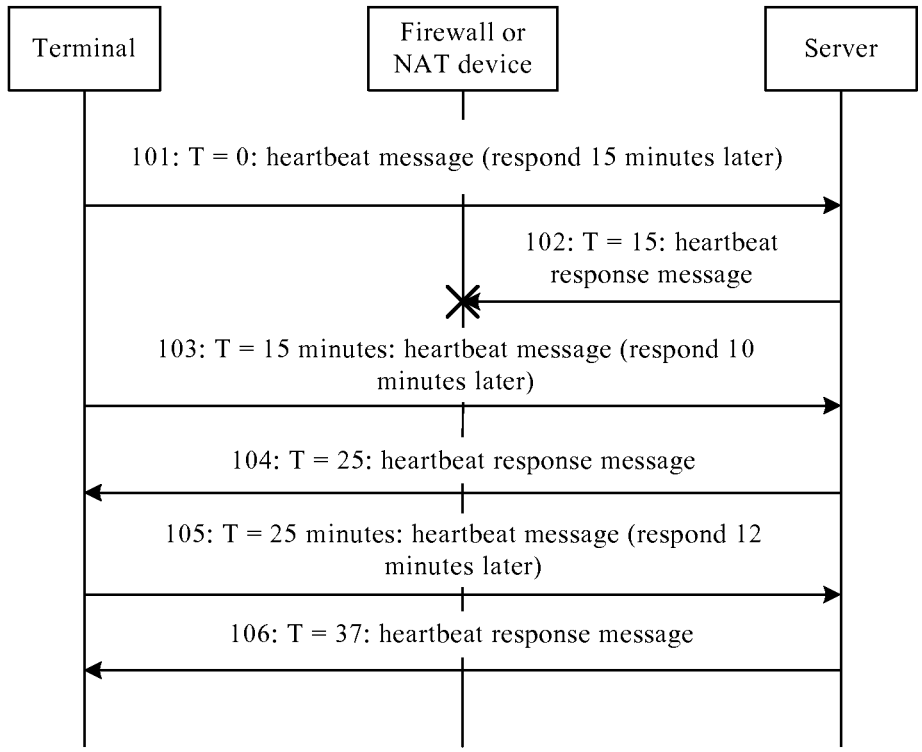
FIG. 1 is a schematic diagram of a heartbeat period adaptive negotiation process implemented by a terminal in the prior art.

To enable persons of ordinary skill in the art to better understand the technical solutions provided in the embodiments of the present invention, the technical solution of the prior art is briefly introduced. As shown in FIG. 1, in the technical solution of the prior art, each terminal performs a heartbeat period adaptive negotiation process with a server in an initial phase, and each terminal finally negotiates a heartbeat period that best matches a current network by trying various heartbeat periods once and again. Specifically, as shown in FIG. 1, it is assumed that a session-hold time interval of a firewall or a network address translation (NAT) device in a network is set to 13 minutes, and the terminal performs a heartbeat period adaptive negotiation process as follows:

101: A terminal sends a heartbeat message to the server, for example, a push gateway (Push GW) at T=0. It is initially assumed that one heartbeat period is 15 minutes and that the heartbeat message carries a parameter requiring the server to return a heartbeat response (OK) message 15 minutes after receiving the heartbeat message. Each time when sending a message, the terminal first establishes an end-to-end connection in the network, for example, it needs to perform an extensible authentication protocol—transport layer security (EAP-TLS) authentication and establish a TLS connection, and so on. This detail is not particularly described here, and this process is also performed when a message is sent subsequently.

102: The server returns the heartbeat response message at T=15 minutes. In this case, because it exceeds session-hold time of the firewall or the NAT device, the heartbeat response message from the server is discarded on the firewall or the NAT device.

103: If the terminal finds that no heartbeat response message is received when a first heartbeat period expires at T=15 minutes, the terminal judges that the heartbeat period cannot be longer than 15 minutes, adjusts the heartbeat period to 10 minutes, and re-sends a heartbeat message to the server, where the heartbeat message carries a parameter requiring that the server return a heartbeat response message 10 minutes after receiving the heartbeat message.

104: The server returns a heartbeat response message at T=25 minutes, where the heartbeat response message reaches the terminal successfully.

105: If the terminal finds that a heartbeat response message is received when a second heartbeat period expires at T=25 minutes, the terminal judges that the heartbeat period is not shorter than 10 minutes, adjusts the heartbeat period to 12 minutes, and re-sends a heartbeat message to the server, where the heartbeat message carries a parameter requiring that the server return a heartbeat response message 12 minutes after receiving the heartbeat message.

106: The server returns a heartbeat response message at T=37 minutes, where the heartbeat response message reaches the terminal successfully.

By now, if the terminal finds that the heartbeat response message is received when a third heartbeat period expires at T=37 minutes, the terminal judges that the heartbeat period is not shorter than 12 minutes, and the terminal continues to adjust the heartbeat period to 14 minutes to retry the heartbeat. If the terminal finally finds that the heartbeat period cannot be longer than 14 minutes, the terminal finally determines that the heartbeat period is 12 minutes and then terminates a heartbeat period adaptive negotiation process. Subsequently, the terminal always sends the heartbeat message by using this heartbeat period.

Through the foregoing heartbeat period adaptive negotiation process, an optimal heartbeat period that the network can support is gradually approached through constant attempts, which can automatically adapt to different network configuration situations. It can be seen that, in the prior art, this heartbeat period adaptive negotiation process involves multiple message interactions and converges relatively slow; the process also involves multiple authentications and connection reestablishment processes, and a whole process not only causes power consumption of the terminal but also increases the traffic of network messages.

For this reason, embodiments of the present invention provide a method, a terminal, and a server for obtaining a heartbeat period.

The technical solutions of the present invention can be applied in various communication systems, for example, a global system for mobile communications (GSM), a general packet radio service (GPRS), a code division multiple access (CDMA) system, a wideband code division multiple access (WCDMA) system, a long term evolution (LTE) system, a wireless local area network (WLAN) system, and a wire communication system.

Figure 2:
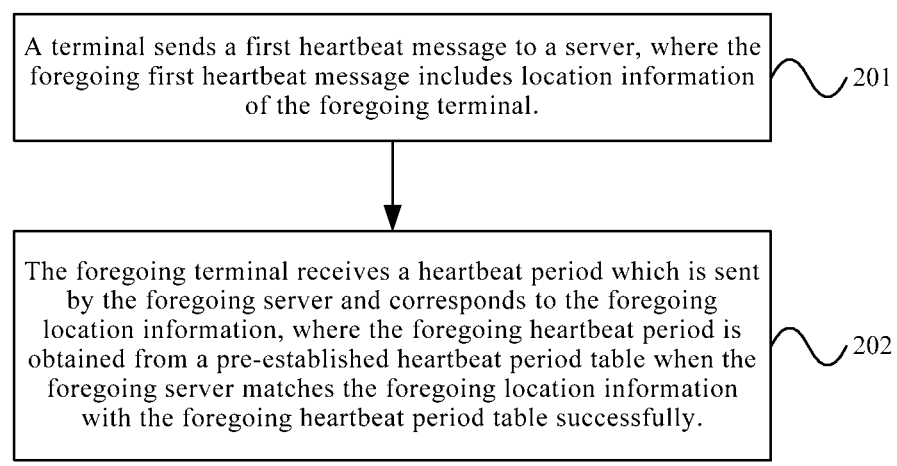
FIG. 2 is a schematic flow chart of a method for obtaining a heartbeat period according to an embodiment of the present invention.

FIG. 2 is a schematic flow chart of a method for obtaining a heartbeat period according to an embodiment of the present invention. As shown in FIG. 2, the method for obtaining the heartbeat period in this embodiment may include:

201: A terminal sends a first heartbeat message to a server, where the foregoing first heartbeat message includes location information of the foregoing terminal. The location information of the foregoing terminal may include but is not limited to geographic location information of the terminal or network location information of the terminal.

It should be noted that in the coverage of a network area, network element devices that the heartbeat message passes through are basically consistent, and all terminals in a network coverage area have basically consistent heartbeat periods. Therefore, in this embodiment of the present invention, by fully using this feature, for a same network coverage area, only one terminal is used to perform an intelligent heartbeat negotiation process, all other terminals can directly use this heartbeat period result or speed up the efficiency of intelligent heartbeat negotiation by using this heartbeat period result.

In an embodiment, the first heartbeat message may be a message obtained by expanding on the basis of an original heartbeat message and adding a location information field. The first heartbeat message may also be an independent location message, where the location message includes but is not limited to the geographic location information of the terminal or the network location information of the terminal.

In an optional implementation manner of this embodiment, the geographic location information of the terminal may be global positioning system (GPS) information of the terminal.

In an optional implementation manner of this embodiment, the network location information of the terminal may be: an IP address of the terminal; a cell identifier (CELL ID) of a cell where the terminal is located; a routing area code (RAC) of a routing area where the terminal is located; a location area code (LAC) of a location area where the terminal is located; a name of an access point (APN) accessed by the terminal; a system identifier (SID) and a network identifier (NID) which are of the terminal in a CDMA system; or an identifier of a wireless fidelity access point (WiFi AP) accessed by the terminal in a WLAN system, for example, a service set ID (SSID) or a medium access control (MAC) address.

202: The foregoing terminal receives a heartbeat period sent by the foregoing server and corresponding to the foregoing location information, where the foregoing heartbeat period is obtained from a pre-established heartbeat period table when the foregoing server matches the foregoing location information with the foregoing heartbeat period table successfully.

In an optional implementation manner of this embodiment, the foregoing terminal may receive a heartbeat period that is sent by the foregoing server through a heartbeat response message and that corresponds to the foregoing location information. In other words, the terminal receives a heartbeat response message sent by the foregoing server, where the heartbeat response message includes a heartbeat period which corresponds to the foregoing location information.

The heartbeat period table may be established by the server and is used to record location information and the corresponding heartbeat period, and its specific form may be various types of databases or files in the prior art, which is not repeatedly described here again.

After step 202, the foregoing terminal may further send a second heartbeat message periodically to the foregoing server by using the foregoing heartbeat period as a sending period, where the foregoing second heartbeat message is used to inform the server of an online state of the foregoing terminal.

In an optional implementation manner of this embodiment, the foregoing terminal may not adjust the foregoing heartbeat period, and the foregoing terminal may send the second heartbeat message periodically to the foregoing server by using the foregoing unadjusted heartbeat period as a sending period.

In another optional implementation manner of this embodiment, because a delay difference on a transmission path is considered and is generally around seconds, a time deviation may be set, and the foregoing terminal may further adjust the foregoing heartbeat period by a time deviation (e.g., 10, 12, or 15 seconds). This reduces the foregoing heartbeat period by 10, 12, or 15 seconds and sends a second heartbeat message periodically to the foregoing server by using the foregoing adjusted heartbeat period as a sending period, which can effectively avoid a problem that the heartbeat periods of some terminals are caused to be unavailable due to transmission delays.

In the foregoing optional implementation manner, because network networking or parameter configurations may be modified, the terminal may fail to receive a heartbeat response message returned by the server within a preset time after the foregoing terminal sends a second heartbeat message to the foregoing server. After the foregoing terminal sends the second heartbeat message to the foregoing server, if the foregoing terminal does not receive, within a preset time (e.g., 10, 12, or 14 minutes) that is determined according to session settings of application programs or the setting of a TCP session-hold time, a heartbeat response which is sent by the foregoing server and corresponds to the foregoing second heartbeat message, the foregoing terminal sends indication information to the foregoing server, where the indication information indicates that the heartbeat period which corresponds to the foregoing location information is invalid, so that the foregoing server updates the heartbeat period which corresponds to the foregoing location information.

After step 202, the foregoing terminal may further interact with the foregoing server by using the foregoing heartbeat period as an initial heartbeat period so as to execute a heartbeat period adaptive negotiation process to determine a heartbeat period that matches a network where the foregoing terminal is located, and the heartbeat message interactions between the terminal and the server can be effectively reduced. The heartbeat period adaptive negotiation process is described in detail in this embodiment of the present invention, which is not repeatedly described here again.

In this embodiment, a terminal sends a first heartbeat message that includes location information of the terminal to a server, and the terminal obtains a heartbeat period which corresponds to the foregoing location information directly from the server. This avoids each terminal needing to perform multiple heartbeat message interactions with the server when determining a heartbeat period that best matches the current network, thereby reducing power consumption of the terminal and signaling loads of a device at the network side.

Figure 3:
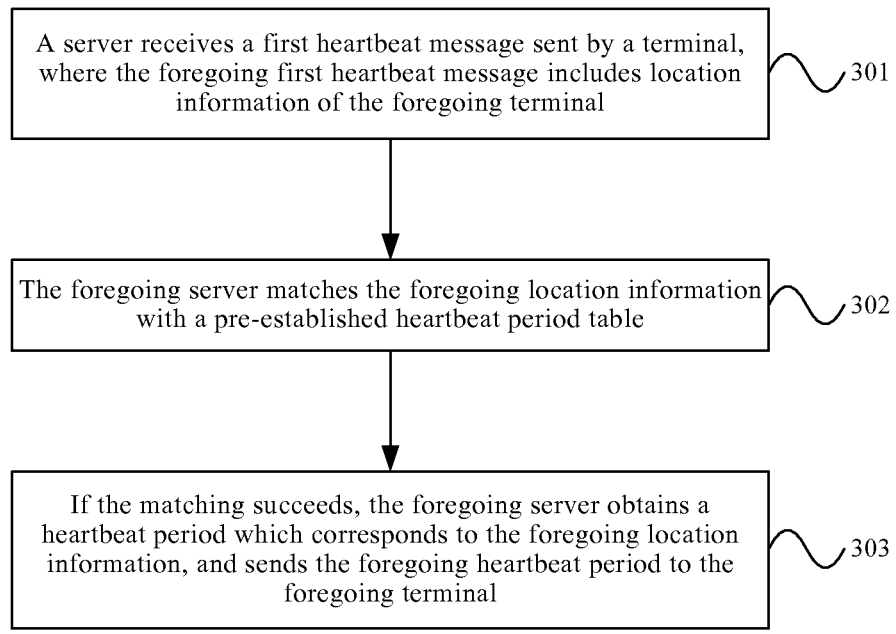
FIG. 3 is a schematic flow chart of a method for obtaining a heartbeat period according to another embodiment of the present invention.

FIG. 3 is a schematic flow chart of a method for obtaining a heartbeat period according to another embodiment of the present invention. As shown in FIG. 3, the method for obtaining a heartbeat period in this embodiment may include:

301: A server receives a first heartbeat message sent by a terminal, where the foregoing first heartbeat message includes location information of the foregoing terminal.

The location information of the foregoing terminal may include but is not limited to geographic location information of the terminal or network location information of the terminal.

In an embodiment, the first heartbeat message may be a message obtained by expanding on the basis of an original heartbeat message and adding a location information field. The first heartbeat message may also be an independent location message, where the location message includes but is not limited to the geographic location information of the terminal or the network location information of the terminal.

In an optional implementation manner of this embodiment, the geographic location information of the terminal may be global positioning system (GPS) information of the terminal.

In an optional implementation manner of this embodiment, the network location information of the terminal may be: an IP address of the terminal; or a cell identifier (CELL ID) of a cell where the terminal is located; a routing area code (RAC) of a routing area where the terminal is located; a location area code (LAC) of a location area where the terminal is located; a name of an access point (APN) accessed by the terminal; a system identifier (SID) and a network identifier (NID) which are of the terminal in a CDMA system; or an identifier of a wireless fidelity access point (WiFi AP) accessed by the terminal in a WLAN system, for example, a service set ID (SSID) or a medium access control (MAC) address.

302: The foregoing server matches the foregoing location information with a pre-established heartbeat period table.

The heartbeat period table may be established by the server and is used to record location information and the corresponding heartbeat period, and its specific form may be various types of databases or files in the prior art, which is not repeatedly described here again.

In the coverage of a network area, network element devices that the heartbeat message passes through are basically consistent, and all terminals in this network coverage area have basically consistent heartbeat periods. Therefore, by using this feature, so long as one terminal in this network coverage area performs an intelligent heartbeat negotiation process, all other terminals can directly use this heartbeat period result or speed up the efficiency of intelligent heartbeat negotiation by using this heartbeat period result. In an embodiment, a basic process of establishing a heartbeat period table by the server includes performing the intelligent heartbeat negotiation process with one terminal in the same network coverage area according to location information of the terminal, obtaining an optimal heartbeat period which corresponds to the location information, associating the location information with an optimal heartbeat period, and adding the association to the heartbeat period table.

It should be noted that location information with relatively small granularity may be used in an initial establishment phase in consideration of accuracy requirements, for example, the Cell ID of a cell where the terminal is located is used as location information. However, in this way, correspondence between a large number of Cell IDs and heartbeat periods is formed, thereby affecting the storage performance and query performance of a system. In a middle establishment phase, a difference between heartbeat periods of neighboring locations may be dynamically analyzed; if this difference is very small (e.g., if the difference between heartbeat periods of neighboring locations is smaller than a preset deviation threshold), these locations may be combined. For example, correspondence between one LAC and the heartbeat period is used to replace correspondence between multiple Cell IDs and the heartbeat period. In this way, the storage performance and query performance of the system can be effectively improved.

In an embodiment, when the matching is performed, the obtained location information may be used as key values and is matched with the heartbeat period table by adopting a hash index method, where the hash index method, as a specific search manner, has an advantage of fast search and can increase a matching speed. It is understandable that the hash index method is not a unique implementation manner of the matching and that another index or search method such as a binary tree index method may also be adopted. Therefore, the hash index method is as an example and should not be understood as a limit to this embodiment of the present invention.

303: If the matching succeeds, the foregoing server obtains a heartbeat period which corresponds to the foregoing location information, and sends the foregoing heartbeat period to the foregoing terminal.

In an optional implementation manner of this embodiment, the foregoing server may send a heartbeat period which corresponds to the foregoing location information to the foregoing terminal through a heartbeat response message, that is, the foregoing server sends a heartbeat response message to the foregoing terminal, where the heartbeat response message includes a heartbeat period which corresponds to the foregoing location information.

In an optional implementation manner of this embodiment, if the matching fails, the foregoing server may further add location information that fails to be matched and a corresponding heartbeat period to the foregoing heartbeat period table as a new record. For example, the foregoing server may perform a heartbeat period adaptive negotiation process with the foregoing terminal to determine a heartbeat period that matches the network where the foregoing terminal is located. Then, the foregoing server may further associate the foregoing location information with the foregoing heartbeat period, and the foregoing server may add the association to the foregoing heartbeat period table.

After step 303, the foregoing server may further receive a second heartbeat message sent by the foregoing terminal and return a heartbeat response which corresponds to the foregoing second heartbeat message to the foregoing terminal, where the foregoing second heartbeat message is used to inform the foregoing server of an online state of the foregoing terminal and a period of the foregoing second heartbeat message is the foregoing heartbeat period.

In an optional implementation manner of this embodiment, the foregoing terminal may not adjust the foregoing heartbeat period and send a second heartbeat message periodically to the foregoing server by using the foregoing unadjusted heartbeat period as a sending period.

In another optional implementation manner of this embodiment, the foregoing terminal may further adjust the foregoing heartbeat period by a preset time deviation (e.g., 10, 12, or 15 seconds) and send the second heartbeat message periodically to the foregoing server by using the foregoing adjusted heartbeat period as a sending period, which can effectively avoid a problem that the heartbeat periods of some terminals are caused to be unavailable due to transmission delays.

In the foregoing optional implementation manner, because network networking or parameter configurations may be modified after the foregoing terminal sends the second heartbeat message to the foregoing server, the terminal may fail to receive, within a preset time, a heartbeat response message returned by the server. Accordingly, the server may further receive indication information sent by the foregoing terminal and update the heartbeat period which corresponds to the foregoing location information, where the foregoing indication information is sent when the foregoing terminal does not receive, within a preset time (e.g., 10, 12, or 14 minutes) that is determined according to session settings of application programs or the setting of a TCP session-hold time, a heartbeat response which is sent by the foregoing server and corresponds to the foregoing second heartbeat message and is used to notify the foregoing server that the heartbeat period which corresponds to the foregoing location information is invalid. For a detailed description, reference may be made to related contents about establishing the heartbeat period table by the foregoing server, which is not repeatedly described here again.

After step 303, the foregoing terminal may further interact with the foregoing server by using the foregoing heartbeat period as an initial heartbeat period so as to execute a heartbeat period adaptive negotiation process to determine a heartbeat period that matches the network where the foregoing terminal is located, which can effectively reduce the heartbeat message interactions between the terminal and the server.

In this embodiment, a server receives a first heartbeat message that is sent by a terminal and includes the location information of the terminal, and the server matches the foregoing location information with a pre-established heartbeat period table; if the matching succeeds, the foregoing server obtains a heartbeat period which corresponds to the foregoing location information and sends the foregoing heartbeat period to the foregoing terminal, so that the foregoing terminal can obtain the heartbeat period which corresponds to the foregoing location information directly from the server. This avoids each terminal needing to perform multiple heartbeat message interactions with the server when determining a heartbeat period that best matches the current network, thereby reducing the power consumption of the terminal and signaling loads of a device at the network side.

It should be noted that, to describe briefly, each foregoing method embodiment is represented as a series of action combinations. But those skilled in the art should know that the present invention is not limited to the order of the described actions, because according to the present invention, some steps may adopt another order or occur simultaneously. Next, those skilled in the art should also know that all the embodiments described in the specification belong to exemplary embodiments and that the involved actions and modules are not necessarily required in the present invention.

In the foregoing embodiments, the description of each embodiment has its emphasis, and for parts of a certain embodiment which are not described in detail, reference may be made to the relevant description of other embodiments.

Figure 4:
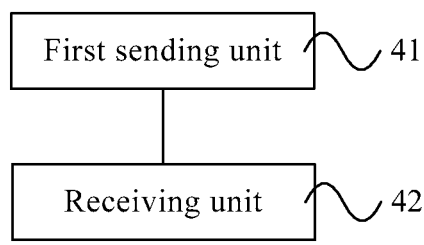
FIG. 4 is a schematic structural diagram of a terminal according to another embodiment of the present invention.

FIG. 4 is a schematic structural diagram of a terminal according to another embodiment of the present invention. As shown in FIG. 4, the terminal according to this embodiment may include a first sending unit 41 and a receiving unit 42. The first sending unit 41 is configured to send a first heartbeat message to a server, where the foregoing first heartbeat message includes location information of the foregoing terminal. The receiving unit 42 is configured to receive a heartbeat period that is sent by the foregoing server and that corresponds to the foregoing location information, where the foregoing heartbeat period is obtained from a pre-established heartbeat period table when the foregoing server matches the foregoing location information with the foregoing heartbeat period table successfully.

In the foregoing embodiment corresponding to FIG. 2, the function of the terminal may be implemented by the terminal provided in this embodiment.

The location information of the foregoing terminal may include but is not limited to geographic location information of the terminal or network location information of the terminal. For detailed description, reference may be made to related contents in the embodiment corresponding to FIG. 1, which is not repeatedly described here again.

In an embodiment, the first heartbeat message may be a message obtained by expanding on the basis of an original heartbeat message and adding a location information field. The first heartbeat message may also be an independent location message, where the location message includes but is not limited to the geographic location information of the terminal or the network location information of the terminal.

Figure 5:
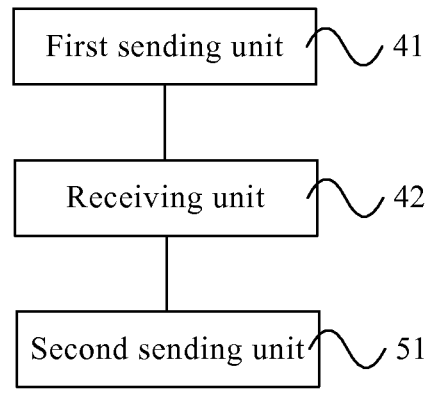
FIG. 5 is a schematic structural diagram of a terminal according to another embodiment of the present invention.

Optionally, as shown in FIG. 5, the terminal provided in this embodiment further includes a second sending unit 51. The second sending unit 51 may further send a second heartbeat message periodically to the foregoing server by using the foregoing heartbeat period as a sending period, where the foregoing second heartbeat message is used to inform the server of an online state of the foregoing terminal.

In an optional implementation manner of this embodiment, the second sending unit 51 may specifically not adjust the foregoing heartbeat period and send the second heartbeat message periodically to the foregoing server by using the foregoing unadjusted heartbeat period as a sending period.

In another optional implementation manner of this embodiment, the second sending unit 51 may further specifically adjust the foregoing heartbeat period by a time deviation (e.g., 10, 12 or 15 seconds) and send a second heartbeat message periodically to the foregoing server by using the foregoing adjusted heartbeat period as a sending period, which can effectively avoid a problem that the heartbeat periods of some terminals are caused to be unavailable due to transmission delays.

Figure 6:
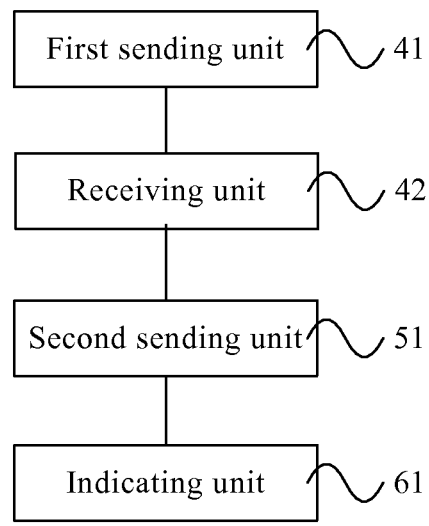
FIG. 6 is a schematic structural diagram of a terminal according to another embodiment of the present invention.

In the foregoing optional implementation manner, because network networking or parameter configurations may be modified, after the second sending unit 51 sends a second heartbeat message to the foregoing server, the terminal may fail to receive, within a preset time, a heartbeat response message returned by the server. Accordingly, as shown in FIG. 6, the foregoing terminal provided in this embodiment may further include an indicating unit 61 which is configured to send indication information to the foregoing server when the foregoing terminal does not receive, within a preset time (e.g., 10, 12, or 14 minutes) that is determined according to session settings of application programs or the setting of a TCP session-hold time, a heartbeat response which is sent by the foregoing server and corresponds to the foregoing second heartbeat message, where the indication information indicates that the heartbeat period which corresponds to the foregoing location information is invalid, so that the foregoing server updates the heartbeat period which corresponds to the foregoing location information.

Figure 7:
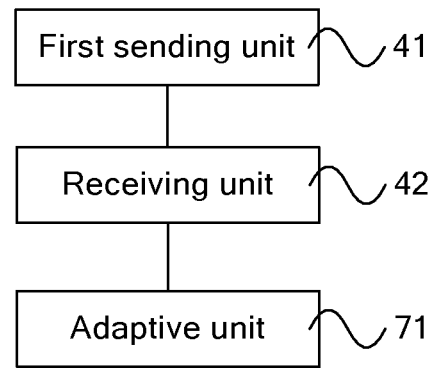
FIG. 7 is a schematic structural diagram of a terminal according to another embodiment of the present invention.

Optionally, as shown in FIG. 7, the terminal in this embodiment further includes an adaptive unit 71. The adaptive unit 71 further interacts with the foregoing server by using the foregoing heartbeat period as an initial heartbeat period so as to execute a heartbeat period adaptive negotiation process to determine a heartbeat period that matches a network where the foregoing terminal is located, which can effectively reduce the heartbeat message interactions between the terminal and the server.

In this embodiment, the terminal sends a first heartbeat message that includes location information of the terminal to the server through the first sending unit, so that the receiving unit can obtain a heartbeat period which corresponds to the foregoing location information directly from the server. This avoids each terminal needing to perform multiple heartbeat message interactions with the server when determining a heartbeat period which best matches the current network, thereby reducing power consumption of the terminal and signaling loads of a device at the network side.

Figure 8:
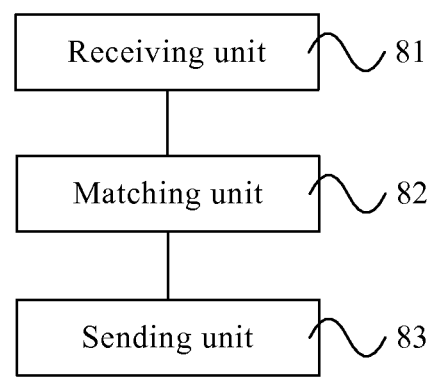
FIG. 8 is a schematic structural diagram of a server according to another embodiment of the present invention.

FIG. 8 is a schematic structural diagram of a server according to another embodiment of the present invention. As shown in FIG. 8, the server in this embodiment may include a receiving unit 81, a matching unit 82, and a sending unit 83. The receiving unit 81 is configured to receive a first heartbeat message sent by a terminal, where the foregoing first heartbeat message includes location information of the foregoing terminal. The matching unit 82 is configured to match the foregoing location information with a pre-established heartbeat period table, and the sending unit 83 is configured to, when the matching performed by the matching unit 82 succeeds, obtain a heartbeat period which corresponds to the foregoing location information and send the foregoing heartbeat period to the foregoing terminal.

In the foregoing embodiment corresponding to FIG. 3, a function of the server may be implemented by the server provided in this embodiment.

The location information of the foregoing terminal may include but is not limited to geographic location information of the terminal or network location information of the terminal. For detailed description, reference may be made to related contents in the embodiment corresponding to FIG. 2, which is not repeatedly described here again.

In an embodiment, the first heartbeat message may be a message obtained by expanding on the basis of an original heartbeat message and adding a location information field, and the first heartbeat message may also be an independent location message, where the location message includes but is not limited to the geographic location information of the terminal or the network location information of the terminal.

Figure 9:
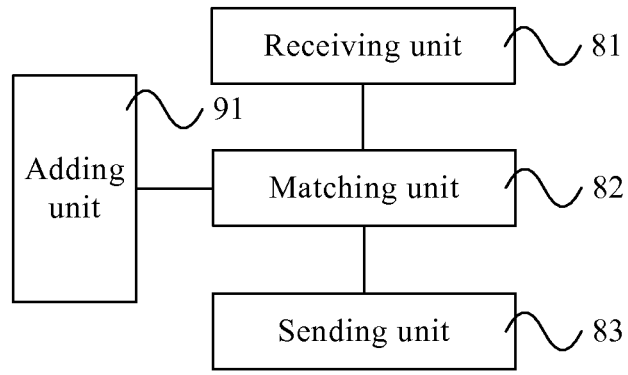
FIG. 9 is a schematic structural diagram of a server according to another embodiment of the present invention.
Figure 10:
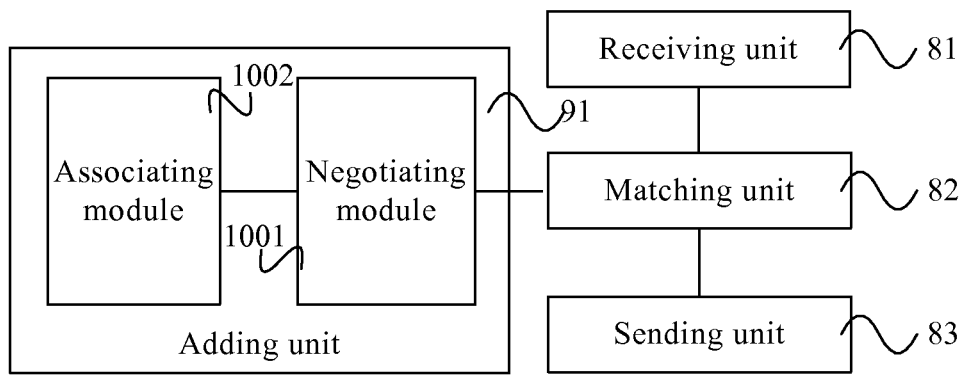
FIG. 10 is a schematic structural diagram of a server according to another embodiment of the present invention.

In an optional implementation manner of this embodiment, as shown in FIG. 9, the foregoing server provided in this embodiment may further include an adding unit 91 which is configured to, when the matching performed by the matching unit 82 fails, add location information that fails to be matched by the matching unit 82 and a corresponding heartbeat period to the foregoing heartbeat period table as a new record. For example, as shown in FIG. 10, the adding unit 91 may specifically include an negotiating module 1001 and an associating module 1002, where the negotiating module 1001 is configured to perform a heartbeat period adaptive negotiation process with the foregoing terminal to determine a heartbeat period that matches the network where the foregoing terminal is located, and the associating module 1002 is configured to associate the foregoing location information with the foregoing heartbeat period and add the association to the foregoing heartbeat period table.

Optionally, the receiving unit 81 in this embodiment may further receive a second heartbeat message sent by the foregoing terminal and return a heartbeat response which corresponds to the foregoing second heartbeat message to the foregoing terminal, where the foregoing second heartbeat message is used to inform the foregoing server of an online state of the foregoing terminal, and a period of the foregoing second heartbeat message is the foregoing heartbeat period.

In an optional implementation manner of this embodiment, the foregoing terminal may not adjust the foregoing heartbeat period and send the second heartbeat message periodically to the foregoing server by using the foregoing unadjusted heartbeat period as a sending period.

In another optional implementation manner of this embodiment, the foregoing terminal may further adjust the foregoing heartbeat period by a preset time deviation (e.g., 10, 12, or 15 seconds) and send the second heartbeat message periodically to the foregoing server by using the foregoing adjusted heartbeat period as a sending period, which can effectively avoid a problem that the heartbeat periods of some terminals are caused to be unavailable due to transmission delays.

In the foregoing optional implementation manner, because network networking or parameter configurations may be modified, after the foregoing terminal sends a second heartbeat message to the foregoing server, the terminal may fail to receive, within a preset time, a heartbeat response message returned by the server. Accordingly, the receiving unit 81 in this embodiment may further receive indication information sent by the foregoing terminal and update the heartbeat period which corresponds to the foregoing location information, where the foregoing indication information is sent by the foregoing terminal when the terminal does not receive, within a preset time, a heartbeat response which is sent by the foregoing server and corresponds to the foregoing second heartbeat message, and the foregoing indication information is used to notify the foregoing server that the heartbeat period which corresponds to the foregoing location information is invalid.

In another optional implementation manner of this embodiment, the foregoing terminal may further interact with the foregoing server by using the foregoing heartbeat period as an initial heartbeat period so as to execute a heartbeat period adaptive negotiation process to determine a heartbeat period that matches the network where the foregoing terminal is located, which can effectively reduce the heartbeat message interactions between the terminal and the server.

In this embodiment, the server receives, through the receiving unit, the first heartbeat message that includes the location information which is of the terminal and is sent by the terminal, and the matching unit matches the foregoing location information with the pre-established heartbeat period table; if the matching performed by the matching unit succeeds, the sending unit obtains a heartbeat period which corresponds to the foregoing location information and sends the foregoing heartbeat period to the foregoing terminal, so that the foregoing terminal can obtain the heartbeat period which corresponds to the foregoing location information directly from the server. This avoids each terminal needing to perform multiple heartbeat message interactions with the server when determining a heartbeat period that best matches the current network, thereby reducing the power consumption of the terminal and signaling loads of the device at the network side.

Those skilled in the art may clearly understand that for the convenience and brevity of description, for a specific working process of the foregoing described system, apparatus, and unit, reference may be made to a corresponding process in the foregoing method embodiments, which is not repeatedly described here again.

In the several embodiments provided in the application, it should be understood that the disclosed system, apparatus, and method may be implemented through another manner. For example, the foregoing described apparatus embodiments are merely exemplary. For example, the division of the units is merely a logical functional division and may be another division manner in actual implementation. For example, multiple units or components can be combined or can be integrated into another system, or some features can be ignored or not performed. In addition, the displayed or discussed mutual couplings, direct couplings, or communication connections may be indirect couplings or communication connections through some interfaces, an apparatus, or a unit, and the couplings may be in an electronic form, a mechanical form, or another form.

The units described as separate parts may be or may not be physically separate, and parts displayed as units may be or may not be physical units. Additionally, units may be located in one location, or may also be distributed onto multiple network elements. A part or all of the units may be selected according to actual needs to achieve the objectives of the solutions of the embodiments.

In addition, each function unit in each embodiment of the present invention may be integrated into a processing unit, each function unit may also be a unit which exists alone physically, or two or more units may be integrated into one unit. The foregoing integrated unit may be implemented by adopting a form of hardware and may also be implemented by adopting a form of hardware plus a software functional unit.

The foregoing integrated unit which is implemented in a form of a software functional unit may be stored in a computer readable storage medium. The foregoing software functional unit is stored in a storage medium and includes several instructions which are used to make a computer device (e.g., a personal computer, a server, or a network device) to execute a part of the steps of the method in each embodiment of the present invention. The foregoing storage medium may be various medium that is capable of storing program codes, including a USB disk, a removable hard disk, a Read-Only Memory (ROM), a Random Access Memory (RAM), a magnetic disk, or a compact disk.

Finally, it should be noted that the foregoing embodiments are merely provided for describing the technical solutions of the present invention, but not intended to limit the present invention. It should be understood by persons of ordinary skill in the art that although the present invention is described in detail with reference to the foregoing embodiments, modifications can still be made to the technical solutions recorded in each foregoing embodiment, or equivalent replacements can be made to some technical features in the technical solutions, and these modifications or replacements do not make the essence of corresponding technical solutions depart from the spirit and scope of the technical solutions of each embodiment of the present invention.

What is claimed is:

1. A method for obtaining a heartbeat period comprising:
   sending, by a terminal, a first heartbeat message to a server, wherein the first heartbeat message comprises location information of the terminal;
   receiving, by the terminal, a heartbeat period sent by the server and corresponding to the location information, wherein the heartbeat period is obtained from a pre-established heartbeat period table when the server matches the location information with the heartbeat period table successfully;
   sending, by the terminal, a second heartbeat message periodically to the server by using the heartbeat period as a sending period, wherein the second heartbeat message is used to inform the server of an online state of the terminal; and
   sending, by the terminal, indication information to the server when the terminal does not receive, within a preset time, a heartbeat response which is sent by the server and corresponds to the second heartbeat message, wherein the indication information is used to indicate that the heartbeat period which corresponds to the location information is invalid such that the server updates the heartbeat period which corresponds to the location information.

2. The method according to claim 1, wherein sending, by the terminal, the second heartbeat message periodically to the server by using the heartbeat period as the sending period comprises adjusting, by the terminal, the heartbeat period by a preset time deviation and sending the second heartbeat message periodically to the server by using the adjusted heartbeat period as the sending period, wherein the second heartbeat message is used to inform the server of the online state of the terminal.

3. The method according to claim 1, wherein after receiving, by the terminal, the heartbeat period which is sent by the server and corresponds to the location information, the method further comprises interacting, by the terminal, with the server by using the heartbeat period as an initial heartbeat period to execute a heartbeat period adaptive negotiation process to determine a heartbeat period that matches a network where the terminal is located.

4. The method according to claim 1, wherein the location information comprises geographic location information of the terminal, and wherein the geographic location information of the terminal comprises global positioning system information of the terminal.

5. The method according to claim 1, wherein the heartbeat period table comprises heartbeat periods of neighboring locations, wherein differences between the heartbeat periods of the neighboring locations are dynamically analyzed, and wherein the neighboring locations are combined into one location with one heartbeat period in the heartbeat period table when the differences between the heartbeat periods of the neighboring locations are less than a preset deviation threshold.

6. The method according to claim 1, wherein the heartbeat period table comprises a hash index, and wherein the location information in the first heartbeat message is used as a key value to search the heartbeat period table using the hash index.

7. A method for obtaining a heartbeat period comprising:
   receiving, by a server, a first heartbeat message sent by a terminal, wherein the first heartbeat message comprises location information of the terminal;
   matching, by the server, the location information with a pre-established heartbeat period table;
   obtaining, by the server when the matching succeeds, a heartbeat period which corresponds to the location information and sending the heartbeat period to the terminal;
   receiving, by the server, a second heartbeat message sent by the terminal;
   returning a heartbeat response which corresponds to the second heartbeat message to the terminal, wherein the second heartbeat message is used to inform the server of an online state of the terminal and a period of the second heartbeat message is the heartbeat period;
   receiving, by the server, indication information sent by the terminal; and
   updating the heartbeat period which corresponds to the location information, wherein the indication information is sent by the terminal when the terminal does not receive, within a preset time, a heartbeat response which is sent by the server and corresponds to the second heartbeat message and is used to notify the server that the heartbeat period which corresponds to the location information is invalid.

8. The method according to claim 7, further comprising adding, by the server when the matching fails, location information that fails to be matched and a corresponding heartbeat period to the heartbeat period table as a new record.

9. The method according to claim 8, wherein adding, by the server when the matching fails, the location information that fails to be matched and the corresponding heartbeat period to the heartbeat period table as the new record comprises:
   performing, by the server, a heartbeat period adaptive negotiation process with the terminal;
   determining a heartbeat period that matches a network where the terminal is located; and
   associating, by the server, the location information with the heartbeat period and adding the association to the heartbeat period table.

10. The method according to claim 7, wherein the location information comprises geographic location information of the terminal, and wherein the geographic location information of the terminal comprises global positioning system information of the terminal.

11. The method according to claim 7, wherein the heartbeat period table comprises heartbeat periods of neighboring locations, wherein differences between the heartbeat periods of the neighboring locations are dynamically analyzed, and wherein the neighboring locations are combined into one location with one heartbeat period in the heartbeat period table when the differences between the heartbeat periods of the neighboring locations are less than a preset deviation threshold.

12. The method according to claim 7, wherein the heartbeat period table comprises a hash index, and wherein the location information in the first heartbeat message is used as a key value to search the heartbeat period table using the hash index.

13. A terminal comprising:
a computer processor configured to:
send a first heartbeat message to a server, wherein the first heartbeat message comprises location information of the terminal;
receive a heartbeat period which is sent by the server and corresponds to the location information, wherein the heartbeat period is obtained from a pre-established heartbeat period table when the server matches the location information with the heartbeat period table successfully;
send a second heartbeat message periodically to the server by using the heartbeat period as a sending period, wherein the second heartbeat message is used to inform the server of an online state of the terminal; and
send indication information to the server when the terminal does not receive, within a preset time, a heartbeat response which is sent by the server and corresponds to the second heartbeat message, wherein the indication information is used to indicate that the heartbeat period which corresponds to the location information is invalid such that the server updates the heartbeat period which corresponds to the location information.

14. The terminal according to claim 13, wherein the computer processor is further configured to adjust the heartbeat period by a preset time deviation and send the second heartbeat message periodically to the server by using the adjusted heartbeat period as the sending period, wherein the second heartbeat message is used to inform the server of the online state of the terminal.

15. The terminal according to claim 13, wherein the computer processor is further configured to interact with the server by using the heartbeat period as an initial heartbeat period to execute a heartbeat period adaptive negotiation process to determine a heartbeat period that matches a network where the terminal is located.

16. The terminal according to claim 13, wherein the heartbeat period table comprises heartbeat periods of neighboring locations, wherein differences between the heartbeat periods of the neighboring locations are dynamically analyzed, and wherein the neighboring locations are combined into one location with one heartbeat period in the heartbeat period table when the differences between the heartbeat periods of the neighboring locations are less than a preset deviation threshold.

17. The terminal according to claim 13, wherein the heartbeat period table comprises a hash index, and wherein the location information in the first heartbeat message is used as a key value to search the heartbeat period table using the hash index.

18. A server, comprising:
a computer processor configured to:
receive a first heartbeat message sent by a terminal, wherein the first heartbeat message comprises location information of the terminal;
match the location information with a pre-established heartbeat period table; and
when the matching performed by the computer processor succeeds, obtain a heartbeat period which corresponds to the location information and send the heartbeat period to the terminal,
wherein the computer processor is further configured to receive a second heartbeat message sent by the terminal and return a heartbeat response which corresponds to the second heartbeat message to the terminal,
wherein the second heartbeat message is used to inform the server of an online state of the terminal,
wherein a period of the second heartbeat message is the heartbeat period,
wherein the computer processor is further configured to receive indication information sent by the terminal and update the heartbeat period which corresponds to the location information, and
wherein the indication information is sent by the terminal when the terminal does not receive, within a preset time, a heartbeat response which is sent by the server and corresponds to the second heartbeat message and is used to notify the server that the heartbeat period which corresponds to the location information is invalid.

19. The server according to claim 18, wherein the computer processor configured to add location information that fails to be matched by the computer processor and a corresponding heartbeat period to the heartbeat period table as a new record when the matching performed by the computer processor fails.

20. The server according to claim 19, wherein the computer processor is further configured to:
perform a heartbeat period adaptive negotiation process with the terminal to determine a heartbeat period that matches a network where the terminal is located; and
associate the location information with the heartbeat period and add the association to the heartbeat period table.

21. The server according to claim 18, wherein the heartbeat period table comprises heartbeat periods of neighboring locations, wherein differences between the heartbeat periods of the neighboring locations are dynamically analyzed, and wherein the neighboring locations are combined into one location with one heartbeat period in the heartbeat period table when the differences between the heartbeat periods of the neighboring locations are less than a preset deviation threshold.

22. The server according to claim 18, wherein the heartbeat period table comprises a hash index, and wherein the location information in the first heartbeat message is used as a key value to search the heartbeat period table using the hash index.

* * * * *

UNITED STATES PATENT AND TRADEMARK OFFICE
CERTIFICATE OF CORRECTION

| | | |
|---|---|---|
| PATENT NO. | : 9,137,268 B2 | Page 1 of 1 |
| APPLICATION NO. | : 13/686086 | |
| DATED | : September 15, 2015 | |
| INVENTOR(S) | : Shengqiang Yang | |

It is certified that error appears in the above-identified patent and that said Letters Patent is hereby corrected as shown below:

Title page

Item (30) Foreign Application Priority Data section should read:

Jan. 17, 2012   (CN) .................................. 201210013866.7

Signed and Sealed this
Sixteenth Day of February, 2016

Michelle K. Lee
*Director of the United States Patent and Trademark Office*